United States Patent [19]

Martinek

[11] 4,450,131
[45] May 22, 1984

[54] ZERO RUNOUT COUNTER-ROTATING FILM EXTRUDER

[75] Inventor: Thomas W. Martinek, Covington, Ind.

[73] Assignee: Teepak, Inc., Chicago, Ill.

[21] Appl. No.: 322,838

[22] Filed: Nov. 19, 1981

[51] Int. Cl.³ .................................................. B29D 23/04
[52] U.S. Cl. ................................ 264/209.2; 264/558;
264/108; 264/202; 264/310; 264/312; 425/376 B; 425/380; 425/381; 425/466; 425/467
[58] Field of Search ................... 264/209.2, 310, 311, 264/312, 108, 558, 202; 425/381, 376 B, 467, 466, 380

[56] References Cited

U.S. PATENT DOCUMENTS

| | | | |
|---|---|---|---|
| 2,046,541 | 7/1936 | Becker | 425/381 |
| 2,144,213 | 1/1939 | Bassett et al. | 425/381 |
| 2,382,504 | 8/1945 | Schultz | 425/380 |
| 2,676,356 | 4/1954 | Becker | 425/380 |
| 2,803,042 | 8/1957 | Lundh | 425/381 |
| 2,896,254 | 7/1959 | Braun | 425/380 |
| 3,111,714 | 11/1963 | Branscum | 425/466 |
| 3,122,788 | 3/1964 | Lieberman | 425/380 |
| 3,221,372 | 12/1965 | Lieberman | 425/467 |
| 3,423,790 | 1/1969 | Gabbrielli | 425/381 |
| 3,540,078 | 11/1970 | Schultz | 264/209.2 |
| 3,651,187 | 3/1972 | Cessna, Jr. | 264/108 |
| 3,769,397 | 10/1973 | Cook et al. | 264/209.2 |
| 3,933,960 | 1/1976 | Cameron et al. | 264/108 |
| 4,060,361 | 11/1977 | Ziolko | 425/133.1 |
| 4,076,481 | 2/1978 | Sansone | 425/376 B |
| 4,100,240 | 7/1978 | Bassani | 264/108 |

FOREIGN PATENT DOCUMENTS 1171147 5/1964 Fed. Rep. of Germany ...... 425/466

Primary Examiner—Jeffery R. Thurlow
Attorney, Agent, or Firm—Michael L. Dunn; Howard M. Ellis; William J. Crossetta

[57] ABSTRACT

This relates to a die assembly for extruding tubular casing films wherein there are counter-rotating die members. One of the die members is mounted for shifting relative to its base under the influence of hydrodynamic pressures of the flowing extrudate so as to be self-centering relative to the other die member. This provides for a high shear cylindrical area leading into the die orifice which is of uniform thickness and which will provide for uniform fiber orientation due to the zero runout of the rotating dies.

15 Claims, 2 Drawing Figures

ZERO RUNOUT COUNTER-ROTATING FILM EXTRUDER

This invention relates in general to the forming of films of tubular material such as coria, collagen, cellulose and the like, and most particularly films which may be utilized as meat casings and the like.

The invention particularly relates to a film extruder apparatus having counter-rotating components whereby uniformity of film wall thickness and fiber orientation within the film is achieved.

Films of the type identified above have been formed utilizing counter-rotating annulus dies having at least an inner rotating member and an outside rotating member. Although each member has its own set of precise bearings and every reasonable effort is made to have the axis of rotation of each set of bearings coincident, even with precision bearings and highly skilled machinists, it is difficult to produce a counter-rotation composite runout with less than 0.0003 inch true indicated runout (TIR). Unless extreme and time consuming care is rendered, composite runouts on the order of 0.001 to 0.002 inch TIR are common.

In accordance with this invention, one member of a rotating die set is mounted for floating movement in an radial direction whereby the hydrodynamic forces inherent in the rotation automatically center this component exactly on the axis of the other component, and thereby zero runout is obtainable. By having a zero runout, films of uniform wall thickness and uniform fiber orientation can be obtained and these films have not only uniformity of stretch and blowout characteristics, but also greater stretch characteristics.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
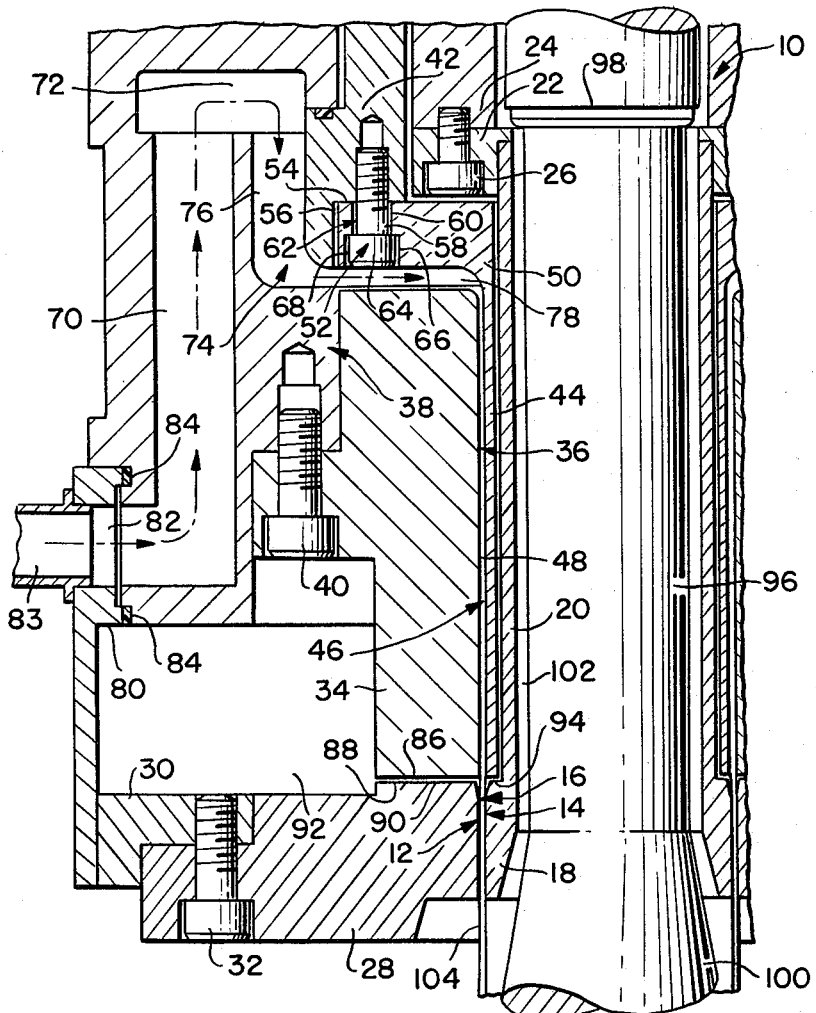
FIG. 1 is a fragmentary sectional view taken through a die assembly in accordance with this invention, and shows the general arrangement of the components thereof.

The die assembly formed in accordance with this invention and generally illustrated in FIG. 1 is identified by the numeral 10 and includes a die orifice 12 which is defined by an inner cylindrical surface 14 and an outer cylindrical surface 16 which are concentric to one another. In a typical die assembly in accordance with this invention, the spacing between the surfaces 14, 16 is on the order of 0.012 to 0.027 inch.

It will be seen that the surface 14 is formed on an inner die member 18 which is of a stepped construction and which includes an elongated cylindrical portion 20. The die member 18 is fixed against rotation and is supported by a mounting block 22 which, in turn, is secured to a suitable base member 24 by fasteners 26.

The surface 16 is defined by an outer die member 28 which is removably secured to a mounting plate 30 by way of fasteners 32.

The die assembly 10 also includes an outer rotating die member 34 which defines an outer cylindrical surface 36 which is generally aligned with the surface 16 of die member 28 but may be spaced slightly radially outwardly thereof. The die member 34 is mounted on a rotating base 38 by means of suitable fasteners 40. It is to be understood that the base 38 is supported by means of suitable bearings (not shown) of a high precision type for rotation substantially without runout about a fixed axis. The bearings mounting the base 38 and the means for effecting rotation of the base 38 are not shown in that they are conventional dies of the type to which this invention relates.

The die assembly 10 also includes a base 42 which is mounted for rotation by means of precision bearings (not shown) for rotation substantially coaxially with the base 38. However, as explained above, even with the use of precision bearings and extreme machining skill, there will be runout between the axis of rotation of the base 42 and the axis of rotation of the base 38.

In accordance with this invention, there is provided a further rotating die member 44 which is of an elongated cylindrical configuration and which presents an inner die surface 46 which is cylindrical. The surfaces 36 and 46 combine to define a flow path 48 which leads into the orifice 12 and wherein the extrudate passes through a region of high radial shear before entering the orifice 12.

The cylindrical die member 44 is provided with a mounting base 50 which is seated in the base 42 and which is secured to the base 42 for rotation therewith by means of mounting fasteners 52 which may be alternated with mounting pins (not shown).

It will be seen that the underside of the rotating base 42 is notched as at 54 for receiving the mounting base 50 and that the diameter of the notch 54 is slightly greater than the external diameter of the mounting base 50 so as to leave an annular space 56 between the exterior of the mounting base 50 and the interior of the notch 54.

It will also be seen that each fastener 52 is provided with a stem 58 of a diameter less than the bore 60 through the mounting base 50 in which it is received so as to provide a clearance 62. Each fastener 52 is also provided with a head 64 which is seated in a recess 66 and wherein there is an annular clearance 68. Finally, it is to be understood that the fasteners 52 are tightened down so that there may be slight movement in an axial direction of the mounting base 50 away from the rotating base 42.

From the foregoing it will be seen that the die 44 may be shifted relative to the rotating base 42 several mils in any radial direction from the axis of rotation of the rotating base 42, and therefore may be self-centering by way of hydrodynamic forces exerted thereon by the flowing extrudate so as to rotate about the axis of rotation of the die 34. In this manner the high shear flow path 48 assures a uniformity of thickness of extrudate containing uniformly oriented fibers for supplying the orifice 12.

It will be seen that the base 38 is provided with an internal flow path 70 which extends axially and then is reversely turned as at 72 so as to open into an area 74 surrounding the lower part of the rotating base 42 and the lower part of the mounting base 50. The area 74 includes a relatively wide annular area 76 having axial flow therethrough which terminates in a second annular area 78 having radial flow therethrough. In the areas 76 and 78 there is low shear.

In order that extrudate may be supplied to the flow passage 70, there is provided a supply ring 80 having a supply passage 82 therethrough and to which there is connected a supply fitting 84. The ring 80 is stationary and is sealed relative to the rotating base 38 by way of annular sealing rings 84.

It will be seen that the member 34 has a lower end surface 86 which opposes an upper end surface 88 on the die member 28 and the surfaces 86 and 88 are in closely spaced relation but free of engagement, leaving therebetween a small clearance 90 through which the extrudate may seep. The passage 90 opens into a space 92 which is closed in any suitable manner (not shown). It is also to be noted that the lower end of the die member 44 remains spaced from an upper surface 94 of the die member 18. Further, the radially inner surface of the die member 44 is spaced from the cylindrical portion 20 of the die member 18 and extrudate may seep thereinto without affecting the operation of the die assembly 10.

There is also provided an internal arbor 96 which is anchored to a suitable support 98 at its upper end and which flares as at 100 toward a larger uniform diameter. There is a space 102 around the arbor 96 through which a suitable coagulant may flow into the newly extruded film tube 104 in a customary manner.

It is to be understood that the spacing of the surfaces 36 and 46 from one another is on the order of 0.030 inch so that, as described above, the extrudate flows through a high radial shear area as it passes into the orifice 12. As a result, there are considerable forces of a hydrodynamic type exerted on the die members 44 and 34 which serve to effect a radial shifting and alignment of the die member 44 with the die member 34 so that the surfaces 36, 46 of the die members are concentric and without runout. It is understood that while the die base 50 is free to move slightly with respect to the rotating base 42, the pressure of the extrudate within the area 78 holds the die base 50 tight against the rotating base 42 while permitting the necessary minute radial movement of the die base 50 relative to the rotating base 42.

At this time it is pointed out that it is also feasible for either the base 38 or the base 42 to be fixed against rotation. If only the die member 34 is rotated, then the hydrodynamic forces will still effect a radial shifting of the die member 44 to effect automatic centering of the die member 44 relative to the die member 34. On the other hand, if only the die member 44 is rotated, then it is preferable that it be fixedly secured to the rotating base 42 and that the die member 34 be so mounted with respect to the base 38 so that it may be free to shift a few mils in all radial directions to assure high runout.

In addition to the feasibility that only one of the die members 34, 44 may be rotated, it is also feasible to rotate both die members 34, 44 in the same direction but at different speeds so as to assure the presence of the aforementioned hydrodynamic forces which will effect a radial shifting of that die member which is mounted for minute radial movement.

Also, while the surfaces 36, 46 defining the high radial shear area have been illustrated and described as being cylindrical, it is feasible that these surfaces may be conical or other generated surfaces of rotation.

Finally, while it is preferred that the extrudate passing from the high radial shear area be directed into an orifice such as the orifice 12, the extruder will function by extruding the material directly from the high radial shear area.

Figure 2:
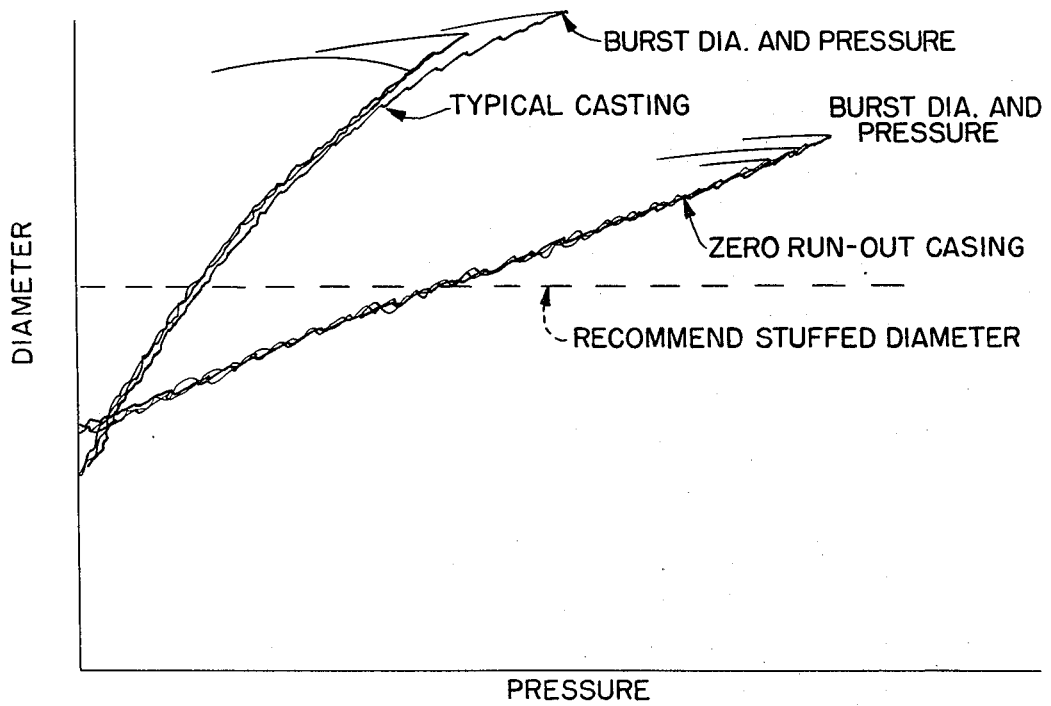
FIG. 2 is a graph plotting tube diameter increase versus pressure with respect to prior art casings and casings formed with the die assembly of FIG. 1.

Reference is now made to FIG. 2 which is a graphical comparison of properties of films made with conventional dies (typical casings) and the die of this invention (zero runout casings). The curves show that a given runout casing is remarkably stronger, more stretch resistant and more uniform than typical casings.

Although only a preferred embodiment of the die assembly has been specifically illustrated and described herein, it is to be understood that minor variations may be made in the die assembly and the method of utilizing the same without departing from the spirit and scope of the invention as defined by the appended claims.

I claim:

1. A tubular film extruder comprising first and second die members defining an elongated annular high shear passage, said die members having adjacent generated surfaces of rotation with one of said first and second die members presenting a first surface of said high shear passage, the other of said first and second die members presenting a second surface concentric with said first surface, one of said surfaces being disposed about an axis, means for mounting the other of said surfaces so said other surface is hydrostatically radially shiftable and positionable about said axis, and means for rotating at least said one surface with extrudate flowing between said surfaces forming means for automatically centering said other surface relative to said one surface.

2. An extruder according to claim 1 wherein said other surface is radially shiftable mounted on a rotating base for rotation with said rotating base.

3. An extruder according to claim 2 wherein said first and second die members also define a low shear passage leading into said high shear passage.

4. An extruder according to claim 3 wherein said low shear passage is annular about said axis and radial.

5. An extruder according to claim 3 wherein said low shear passage is annular about said axis and radial, and further includes a supply low shear passage which is annular about said axis and axial.

6. An extruder according to claim 1 wherein said first and second die members also define a low shear passage leading into said high shear passage.

7. An extruder according to claim 6 wherein said low shear passage is annular about said axis and radial.

8. An extruder according to claim 7 wherein said low shear passage is annular about said axis and radial, and further includes a supply low shear passage which is annular about said axis and axial.

9. An extruder according to claim 2 wherein said die members rotate in different directions.

10. An extruder according to claim 2 wherein said die members rotate in the same direction at different speeds.

11. An extruder according to claim 1 together with third and fourth die members which are fixed and define an annular orifice, and said annular high shear passage leads into said orifice.

12. An extruder according to claim 11 wherein said first and second die members have ends opposing respective ones of said third and fourth die members.

13. A process of extruding tubular films, said process comprising the steps of providing an elongated annular high shear passage defined by concentric generated surfaces of rotation at least one of which is rotating about an axis and the other of said surfaces is hydrostatically radially shifted about said axis to be concentric with said one surface with substantially zero runout to provide a uniform extrudate supply.

14. A process according to claim 13 wherein said other surface is also mounted for rotation.

15. A process according to claim 13 wherein said uniform extrudate supply is directed into an annular orifice.

* * * * *